United States Patent
Fujii et al.

(10) Patent No.: US 8,234,254 B2
(45) Date of Patent: Jul. 31, 2012

(54) IMAGE RECOGNITION APPARATUS, METHOD AND SYSTEM FOR REALIZING CHANGES IN LOGICAL STRUCTURE MODELS

(75) Inventors: Yusaku Fujii, Kawasaki (JP); Katsuhito Fujimoto, Kawasaki (JP); Hiroaki Takebe, Kawasaki (JP); Hiroshi Tanaka, Kawasaki (JP); Yoshinobu Hotta, Kawasaki (JP); Akihiro Minagawa, Kawasaki (JP); Noriaki Ozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 12/258,896

(22) Filed: Oct. 27, 2008

(65) Prior Publication Data

US 2009/0110280 A1 Apr. 30, 2009

(30) Foreign Application Priority Data

Oct. 31, 2007 (JP) ................................ 2007-284295

(51) Int. Cl.
*G06F 7/00* (2006.01)
*G06F 17/00* (2006.01)

(52) U.S. Cl. ........ 707/687; 707/690; 707/694; 707/701; 382/173; 382/181

(58) Field of Classification Search .................. 707/687, 707/690, 694, 701; 382/173, 181
See application file for complete search history.

(56) References Cited

U.S. PATENT DOCUMENTS

| | | | | |
|---|---|---|---|---|
| 5,799,115 | A * | 8/1998 | Asano et al. | 382/305 |
| 6,009,194 | A * | 12/1999 | Hirayama | 382/173 |
| 2001/0043740 | A1* | 11/2001 | Ichikawa et al. | 382/176 |
| 2002/0044688 | A1* | 4/2002 | Naoi et al. | 382/190 |
| 2004/0078755 | A1* | 4/2004 | Shinjo et al. | 715/505 |
| 2006/0129583 | A1* | 6/2006 | Catorcini et al. | 707/101 |
| 2008/0069437 | A1* | 3/2008 | Baker | 382/159 |
| 2010/0138398 | A1* | 6/2010 | Yoshizawa | 707/690 |

FOREIGN PATENT DOCUMENTS

| | | |
|---|---|---|
| JP | 11-328306 | 11/1999 |
| JP | 2000-322502 | 11/2000 |
| JP | A 2006-352290 | 12/2006 |

OTHER PUBLICATIONS

Fujimoto, Katsuhito et al: "Document Image Recognition for e-Documents and Internal Control", Fujitsu, Fujitsu Limited, May 10, 2007, vol. 58, No. 3, p. 176-182, with partial English translation.
English Translation of Japanese Office Action issued in related Japanese Application No. 2007-284295 on Aug. 23, 2011.

* cited by examiner

*Primary Examiner* — Hares Jami
(74) *Attorney, Agent, or Firm* — Greer, Burns & Crain, Ltd.

(57) ABSTRACT

An image recognition method is conducted by recognizing logical elements based on a logical structure model set to correspond to the logical structure of an image of individual character strings, collecting information processed with the logical structure model of images of a logical structure, acquiring a recognition result when recognizing an image of a logical structure by processing information collected with a post-update logical structure model,
and outputting warning information about the post-update logical structure model to an output unit when a result of the comparison is a non-match.

6 Claims, 17 Drawing Sheets

FIG. 3

PURCHASE APPLICATION FORM

REFERENCE NUMBER           305

FULL NAME           PATENT TARO

ADDRESS   TOKYO-TO, CHIYODA-KU, KASUMIGASEKI 1-1-1

TELEPHONE NUMBER           03-444-555

| NO. | 16756400 |                       |
|-----|----------|-----------------------|
| NO. | 22001111 |                       |
| NO. | 80221670 | WHITE OR RED PREFERRED |
| NO. | 90814320 |                       |
| NO. | 10893784 |                       |
| NO. |          |                       |
| NO. |          |                       |

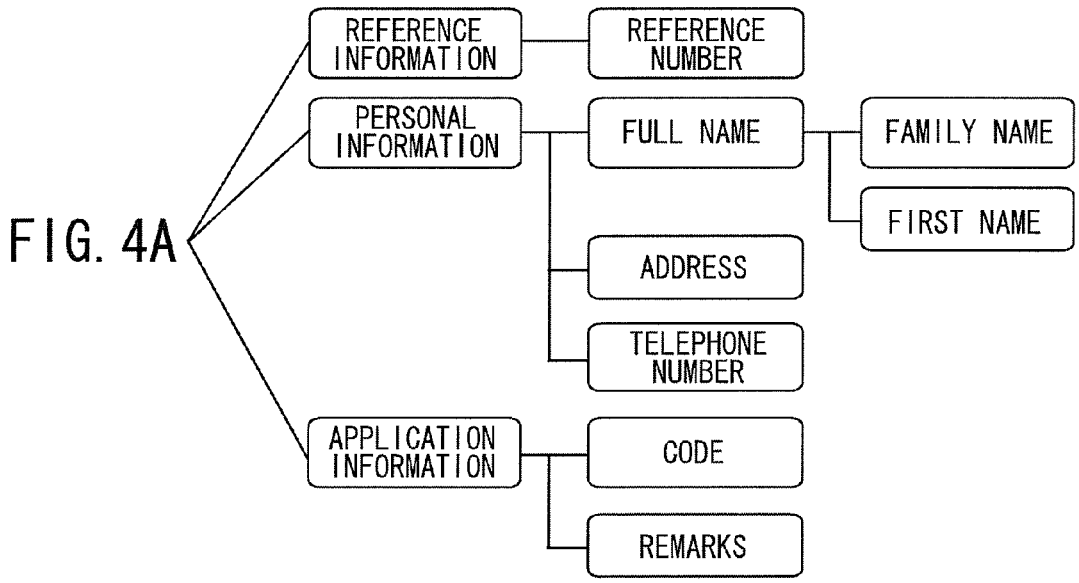

| ID | HEADING CHARACTER STRING | MEANING | TIER | PARENT | POSITION | ATTRIBUTE | DATA | | |
|---|---|---|---|---|---|---|---|---|---|
| 1 | | REFERENCE INFORMATION | 0 | 0 | 3:BELOW | GROUP | | | |
| 2 | REFERENCE NUMBER | REFERENCE NUMBER | 1 | 1 | 4:BELOW | NODE | NUMERICAL STRING | | |
| 3 | | PERSONAL INFORMATION | 0 | 0 | 9:BELOW | GROUP | | | |
| 4 | FULL NAME | FULL NAME | 1 | 3 | | GROUP | | | |
| 5 | ADDRESS | ADDRESS | 1 | 3 | 6:RIGHT, BELOW | NODE | JAPANESE CHARACTER STRING | NUMERICAL STRING | 「-」 |
| 6 | TELEPHONE NUMBER | TELEPHONE NUMBER | 1 | 3 | 5:LEFT, ABOVE | NODE | NUMERICAL STRING | 「-」 | |
| 7 | | FAMILY NAME | 2 | 4 | 8:RIGHT | NODE | JAPANESE CHARACTER STRING | | |
| 8 | | FIRST NAME | 2 | 4 | 7:LEFT | NODE | JAPANESE CHARACTER STRING | | |
| 9 | | APPLICATION INFORMATION | 0 | 0 | 3:ABOVE | GROUP | | | |
| 10 | NO. | CODE | 1 | 9 | 11:RIGHT | NODE | NUMERICAL STRING | | |
| 11 | REMARKS | REMARKS | 1 | 9 | 10:LEFT | NODE | JAPANESE CHARACTER STRING | | |
| : | : | : | : | : | : | : | : | : | : |

FIG. 5

| LOGICAL ELEMENT CATEGORY | | | LOGICAL STRUCTURE RECOGNITION RESULT |
|---|---|---|---|
| REFERENCE INFORMATION | REFERENCE NUMBER | | 305 |
| PERSONAL INFORMATION | FULL NAME | FAMILY NAME | PATENT |
| | | FIRST NAME | TARO |
| | ADDRESS | | TOKYO-TO, CHIYODA-KU, KASUMIGASEKI 1-1-1 |
| | TELEPHONE NUMBER | | 03-444-555 |
| APPLICATION INFORMATION | CODE | | 16756400 |
| | REMARKS | | |
| | CODE | | 22001111 |
| | REMARKS | | |
| | CODE | | 80221670 |
| | REMARKS | | RED OR WHITE PREFERRED |
| | CODE | | 90814320 |
| | REMARKS | | |
| | CODE | | 10893784 |
| | REMARKS | | |
| | CODE | | |
| | REMARKS | | |

FIG. 6A

|  | PURCHASE APPLICATION FORM | |
|---|---|---|
| REFERENCE NUMBER | 305 | |
| FULL NAME | PATENT TARO | |
| ADDRESS | TOKYO-TO, CHIYODA-KU, KASUMIGASEKI 1-1-1 | |
| TELEPHONE NUMBER | 03-444-555 | |

| NO. | 16756400 | |
|---|---|---|
| NO. | 22001111 | |
| NO. | 80221670 | WHITE OR RED PREFERRED |
| NO. | 90814320 | |
| NO. | 10893784 | |
| NO. | | |
| NO. | | |

FIG. 6B

| LOGICAL ELEMENT CATEGORY | | | LOGICAL STRUCTURE RECOGNITION RESULT |
|---|---|---|---|
| REFERENCE INFORMATION | REFERENCE NUMBER | | 305 |
| PERSONAL INFORMATION | FULL NAME | FAMILY NAME | PATENT |
| | | FIRST NAME | TARO |
| | ADDRESS | | TOKYO-TO, CHIYODA-KU, KASUMIGASEKI 1-1-1 |
| | TELEPHONE NUMBER | | 03-444-555 |
| APPLICATION INFORMATION | CODE | | 16756400 |
| | REMARKS | | |
| | CODE | | 22001111 |
| | REMARKS | | |
| | CODE | | 80221670 |
| | REMARKS | | RED OR WHITE PREFERRED |
| | CODE | | 90814320 |
| | REMARKS | | |
| | CODE | | 10893784 |
| | REMARKS | | |
| | CODE | | |
| | REMARKS | | |

FIG. 7

```
                                                    NO.    29
                        PURCHASE APPLICATION FORM

FULL NAME            ECONOMY ICHIRO

ADDRESS   KANAGAWA-KEN, YOKOHAMA-SHI, NAKA-KU 1-1-1

TELEPHONE NUMBER            045-666-777

30492043
                    40920343
                    10032043
                    38954832
                    05403924
                    00103296     PACK OF TEN PLEASE
```

FIG. 8A

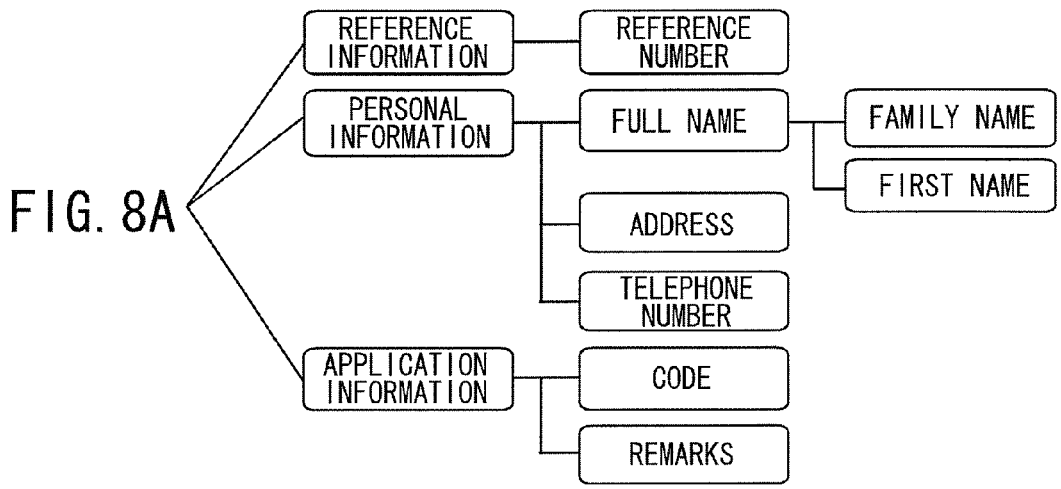

FIG. 8B

| ID | HEADING CHARACTER STRING | MEANING | TIER | PARENT | POSITION | ATTRIBUTE | DATA | | |
|---|---|---|---|---|---|---|---|---|---|
| 1 |  | REFERENCE INFORMATION | 0 | 0 | 3:BELOW | GROUP |  |  |  |
| 2 | REFERENCE NUMBER / NO. | REFERENCE NUMBER | 1 | 1 | 4:BELOW | NODE | NUMERICAL STRING |  |  |
| 3 |  | PERSONAL INFORMATION | 0 | 0 | 9:BELOW | GROUP |  |  |  |
| 4 | FULL NAME | FULL NAME | 1 | 3 |  | GROUP |  |  |  |
| 5 | ADDRESS | ADDRESS | 1 | 3 | 6:RIGHT, BELOW | NODE | JAPANESE CHARACTER STRING | NUMERICAL STRING | 「-」 |
| 6 | TELEPHONE NUMBER | TELEPHONE NUMBER | 1 | 3 | 5:LEFT, ABOVE | NODE | NUMERICAL STRING | 「-」 |  |
| 7 |  | FAMILY NAME | 2 | 4 | 8:RIGHT | NODE | JAPANESE CHARACTER STRING |  |  |
| 8 |  | FIRST NAME | 2 | 4 | 7:LEFT | NODE | JAPANESE CHARACTER STRING |  |  |
| 9 |  | APPLICATION INFORMATION | 0 | 0 | 3:ABOVE | GROUP |  |  |  |
| 10 | NO. / NONE | CODE | 1 | 9 | 11:RIGHT | NODE | NUMERICAL STRING |  |  |
| 11 | REMARKS | REMARKS | 1 | 9 | 10:LEFT | NODE | JAPANESE CHARACTER STRING |  |  |
| : | : | : | : | : | : | : | : | : | : |

FIG. 9

| LOGICAL ELEMENT CATEGORY | | | LOGICAL STRUCTURE RECOGNITION RESULT |
|---|---|---|---|
| REFERENCE INFORMATION | REFERENCE NUMBER | | 29 |
| PERSONAL INFORMATION | FULL NAME | FAMILY NAME | ECONOMY |
| | | FIRST NAME | ICHIRO |
| | ADDRESS | | KANAGAWA-KEN, YOKOHAMA-SHI, NAKA-KU 1-1-1 |
| | TELEPHONE NUMBER | | 045-666-777 |
| APPLICATION INFORMATION | CODE | | 30492043 |
| | REMARKS | | |
| | CODE | | 40920343 |
| | REMARKS | | |
| | CODE | | 10032043 |
| | REMARKS | | |
| | CODE | | 38954832 |
| | REMARKS | | |
| | CODE | | 05403924 |
| | REMARKS | | |
| | CODE | | 00103296 |
| | REMARKS | | PACK OF TEN PLEASE |

FIG. 10

| LOGICAL ELEMENT CATEGORY | | | LOGICAL STRUCTURE RECOGNITION RESULT |
|---|---|---|---|
| REFERENCE INFORMATION | REFERENCE NUMBER | | 305 |
| | | | 16756400 |
| | | | 22001111 |
| | | | 80221670 |
| | | | 90814320 |
| | | | 10893784 |
| PERSONAL INFORMATION | FULL NAME | FAMILY NAME | PATENT |
| | | FIRST NAME | TARO |
| | ADDRESS | | TOKYO-TO, CHIYODA-KU, KASUMIGASEKI 1-1-1 |
| | TELEPHONE NUMBER | | 03-444-555 |
| APPLICATION INFORMATION | CODE | | |
| | REMARKS | | |
| | CODE | | |
| | REMARKS | | |
| | CODE | | |
| | REMARKS | | RED OR WHITE PREFERRED |
| | CODE | | |
| | REMARKS | | |
| | CODE | | |
| | REMARKS | | |
| | CODE | | |
| | REMARKS | | |

FIG. 11

| LOGICAL ELEMENT CATEGORY | | | LOGICAL STRUCTURE RECOGNITION RESULT | |
|---|---|---|---|---|
| | | | BEFORE UPDATE | AFTER UPDATE |
| REFERENCE INFORMATION | REFERENCE NUMBER | | 305 | 305 |
| | | | | 16756400 |
| | | | | 22001111 |
| | | | | 80221670 |
| | | | | 90814320 |
| | | | | 10893784 |
| PERSONAL INFORMATION | FULL NAME | FAMILY NAME | PATENT | PATENT |
| | | FIRST NAME | TARO | TARO |
| | ADDRESS | | TOKYO-TO, CHIYODA-KU KASUMIGASEKI 1-1-1 | TOKYO-TO, CHIYODA-KU KASUMIGASEKI 1-1-1 |
| | TELEPHONE NUMBER | | 03-444-555 | 03-444-555 |
| APPLICATION INFORMATION | CODE | | 16756400 | |
| | REMARKS | | | |
| | CODE | | 22001111 | |
| | REMARKS | | | |
| | CODE | | 80221670 | |
| | REMARKS | | RED OR WHITE PREFERRED | RED OR WHITE PREFERRED |
| | CODE | | 90814320 | |
| | REMARKS | | | |
| | CODE | | 10893784 | |
| | REMARKS | | | |
| | CODE | | | |
| | REMARKS | | | |

FIG. 12

| ID | HEADING CHARACTER STRING | MEANING | TIER | PARENT | POSITION | ATTRIBUTE | DATA | |
|---|---|---|---|---|---|---|---|---|
| 1 | REFERENCE NUMBER | REFERENCE INFORMATION | 0 | 0 | 3:BELOW | GROUP | | |
| 2 | NO. | REFERENCE NUMBER | 1 | 1 | 4:BELOW | NODE | NUMERICAL STRING | |
| 3 | | PERSONAL INFORMATION | 0 | 0 | 9:BELOW | GROUP | | |
| 4 | FULL NAME | FULL NAME | 1 | 3 | 6:RIGHT, BELOW | GROUP | | |
| 5 | ADDRESS | ADDRESS | 1 | 3 | 5:LEFT, ABOVE | NODE | JAPANESE CHARACTER STRING | |
| 6 | TELEPHONE NUMBER | TELEPHONE NUMBER | 1 | 3 | 8:RIGHT | NODE | NUMERICAL STRING | |
| 7 | | FAMILY NAME | 2 | 4 | 7:LEFT | NODE | JAPANESE CHARACTER STRING | |
| 8 | | FIRST NAME | 2 | 4 | 3:ABOVE | NODE | JAPANESE CHARACTER STRING | |
| 9 | | APPLICATION INFORMATION | 0 | 0 | 11:RIGHT | GROUP | | |
| 10 | NO. / NONE | CODE | 1 | 9 | 10:LEFT | NODE | NUMERICAL STRING / 8 DIGIT NUMERICAL STRING | 「-」 / 「-」 |
| 11 | REMARKS | REMARKS | 1 | 9 | | NODE | JAPANESE CHARACTER STRING | |
| .. | .. | .. | .. | .. | .. | .. | .. | .. |

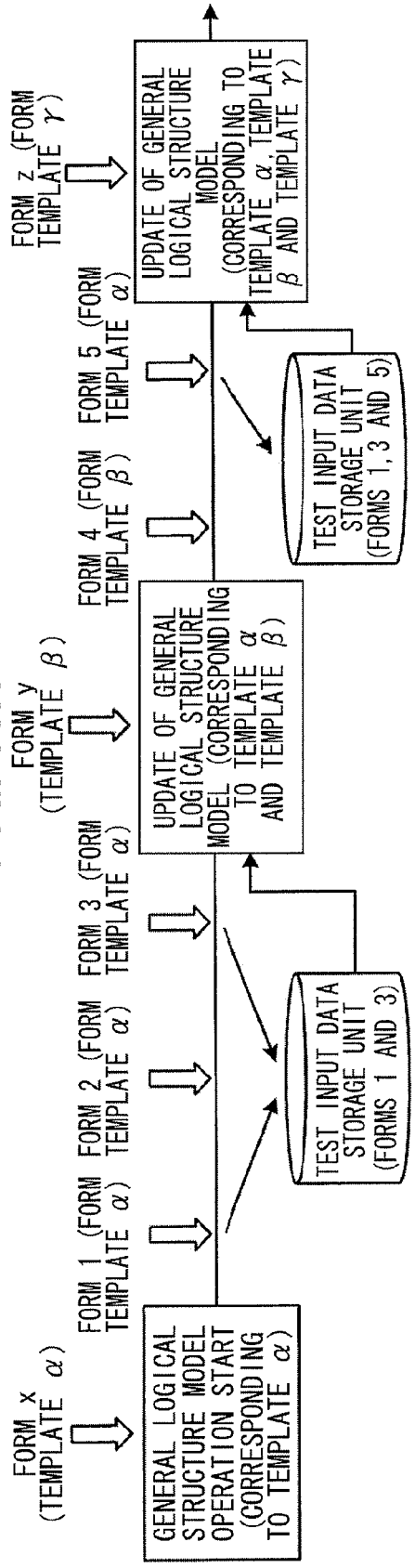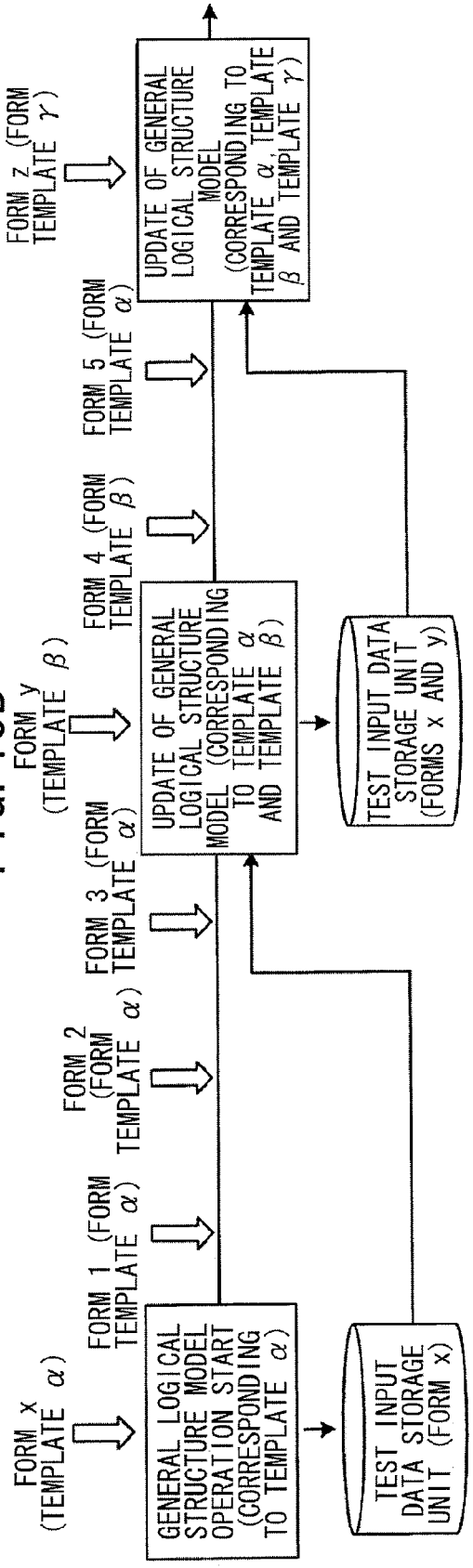
FIG. 15A
FIG. 15B

IMAGE RECOGNITION APPARATUS, METHOD AND SYSTEM FOR REALIZING CHANGES IN LOGICAL STRUCTURE MODELS

BACKGROUND

In recent years, along with the computerization of business, a large number of electronic documents are being used. For this reason, the importance of an image recognition technique, such as OCR (Optical Character Reader or Optical Character Recognition), as a technique of converting paper documents into electronic documents, is increasing.

Here, in order to recognize a document using such an image recognition technique, it is necessary to set a general logical structure model in such a way as to correspond to a logical structure of a document which is to be a subject of recognition. For example, in a case of handling a new form due to the appearance of a new client, the general logical structure model is updated in such a way as to correspond to a new logical structure.

In JP-A-2006-352290, a technique is disclosed wherein a scenario compilation apparatus connected to a communication instrument compiles a scenario for testing the communication instrument, based on signals actually transmitted and received by the communication instrument in operation.

However, with the above previously known technique, there has been a problem in that it is not possible to allow a user to avoid an occurrence of an inconvenience that accompanies the update of the general logical structure model. That is, in the event that the update of the general logical structure model is not carried out appropriately, there is a danger that a recognition of an already existing document will cease to go smoothly, and may become a cause of trouble if the user does not notice the problem when starting an operation.

SUMMARY

According to an aspect of an embodiment, an image recognition method, with regard to an image in which individual character strings are each depicted as a plurality of logical elements configuring a logical structure, and recognizing each of the logical elements based on a logical structure model set in such a way as to correspond to the logical structure, collects information on the image of the logical structure to be processed with the logical structure model; when the logical structure model is updated to a new logical structure model in such a way as to correspond to a new logical structure, acquires a recognition result when recognizing, based on the post-update logical structure model, an image of the logical structure to which the pre-update logical structure model corresponds by processing the information collected with the post-update logical structure model; compares whether or not a recognition result when the information collected is processed with the pre-update logical structure model, and a recognition result acquired from the post-update logical structure model, match; and outputs warning information indicating a warning about the post-update logical structure model to an output unit when a result of the comparison is a non-match.

DRAWINGS

FIG. 3 is a diagram illustrating a form image storage unit;

FIGS. 4A and 4B are diagrams illustrating a general logical structure model storage unit;

FIG. 5 is a diagram illustrating a logical structure recognition result storage unit;

FIGS. 6A and 6B are diagrams illustrating a test input data storage unit;

FIG. 7 is a diagram illustrating a post-update general logical structure model storage unit;

FIGS. 8A and 8B are diagrams illustrating the post-update general logical structure model storage unit;

FIG. 9 is a diagram illustrating the post-update general logical structure model storage unit;

FIG. 10 is a diagram illustrating a logical structure recognition result comparison result storage unit;

FIG. 11 is a diagram illustrating the logical structure recognition result comparison result storage unit;

FIG. 12 is a diagram illustrating a warning output unit;

FIGS. 15A and 15B are diagrams illustrating a test input data collection timing in a second embodiment;

EMBODIMENT

Figure 1:
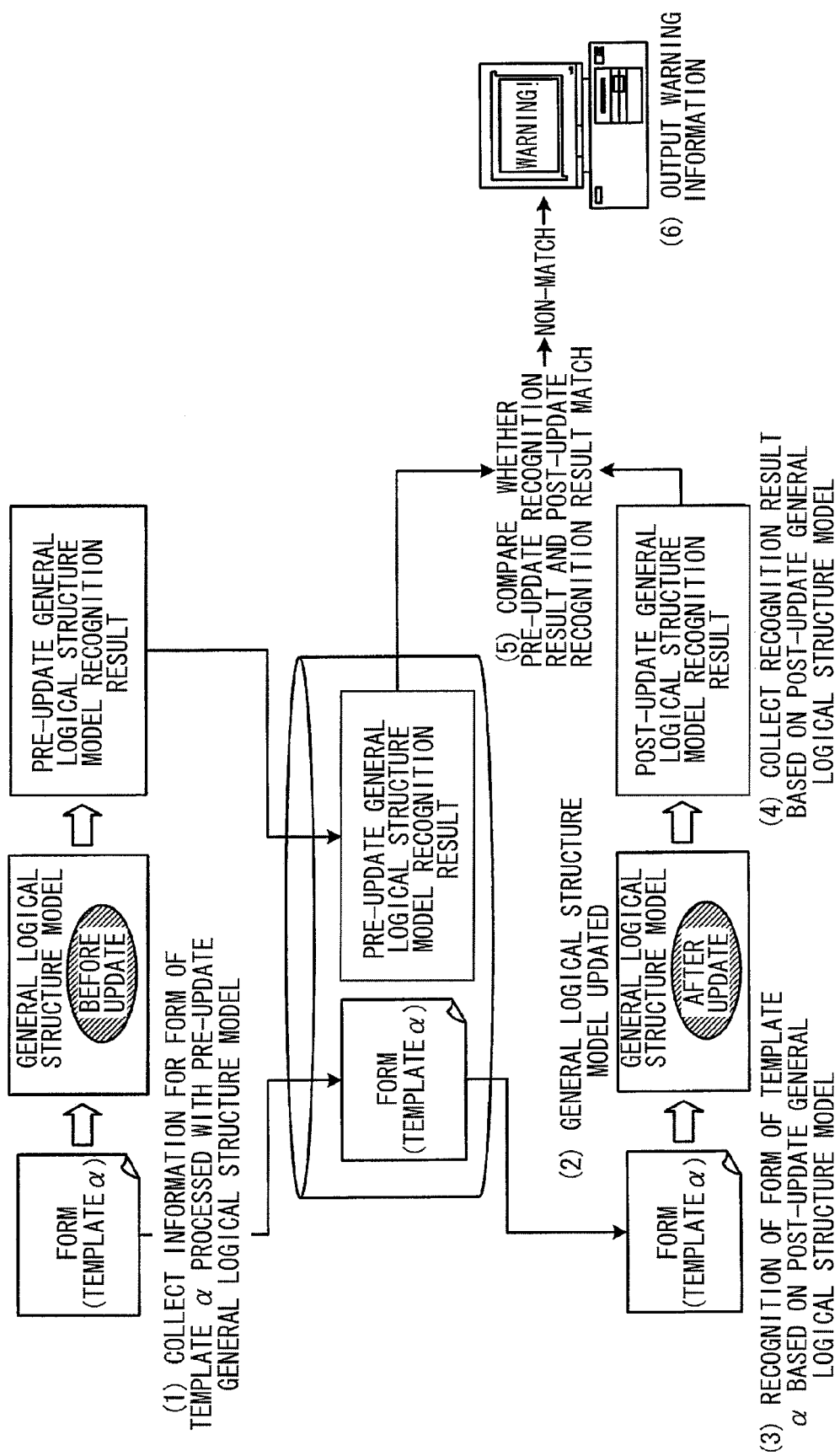
FIG. 1 is a diagram illustrating an outline and characteristics of an image recognition apparatus according to a first embodiment.

Hereafter, a detailed description will be given, with reference to the attached drawings, of embodiments of an image recognition apparatus, an image recognition program, and an image recognition method. Hereafter, a description will be given of the main terminology used in the embodiments, an outline and characteristic of an image recognition apparatus according to a first embodiment, a configuration and process procedure of the image recognition apparatus according to the first embodiment, and an advantage of the first embodiment, followed by descriptions of other embodiments.

First Embodiment

Description of Terminology

Firstly, a description will be given of the main terminology used in the following embodiments. "Image" as used in the following embodiments, is an image in which individual character strings are each depicted as a plurality of logical elements configuring a predetermined logical structure, and may be, for example, a form image. Here, a form image may have sections for filling in "name," "address," and "telephone number" as personal information, and sections for filling in "address" and "telephone number" as workplace information, where individual characters strings are depicted in each of the sections. In this kind of form image, the logical structure refers to a structure wherein the "full name," "address," and "telephone number" are on tiers below the "personal information," the "address" and "telephone number" are on tiers below the "workplace information," and a "personal information" tier and a "workplace information" tier are the same tier. Also, the "full name," "address," "telephone number," and the like are the plurality of logical elements configuring the logical structure. In other words, it can be said that, for example, the logical structure and logical elements are such that, when a format of the relevant form image is compiled by a compiler who compiles form image formats, the logical structure is set as a structure formed by a plurality of sections (regardless of whether it be intentionally or unintentionally), and the plurality of sections are set as the logical elements. Meanwhile, when the image recognition apparatus carries out a process on the relevant form image, the structure formed by the plurality of sections in the form image is handled as the logical structure, and the plurality of sections are handled as the logical elements. The image is not limited to a form image. Anything is acceptable as long as it is an image in which an individual character string is depicted in each of a plurality of sections, such as an image of a survey in which an answer is filled in for each of a plurality of questions.

However, the image recognition apparatus according to the first embodiment recognizes each logical element of an image based on a general logical structure model set in such a way as to correspond to a predetermined logical structure. Here, the general logical structure model is set in such a way as to correspond to the structure where the "full name," "address," and "telephone number" are on tiers below the "personal information," the "address," and "telephone number" are on tiers below the "workplace information," and the "personal information" tier and the "workplace information" tier are the same tier. Also, in the general logical structure model, a positional relationship or the like may be set such as where the "workplace information" is depicted below the "personal information."

Based on such a general logical structure model, the image recognition apparatus, by recognizing a correspondence between each character string and each logical element, recognizes each logical element of the image. For example, by recognizing a handwritten character string as "Patent Taro" using an image recognition technique such as OCR, by recognizing that the character string "Patent Taro" is depicted as the logical element "name" based on the general logical structure model, and by recognizing the correlation between the character string "Patent Taro" and the logical element "full name," the image recognition apparatus recognizes the logical elements of the form image. In the following embodiments, this kind of recognition will be referred to as "logical structure recognition" or "recognizing the logical structure," as appropriate.

Naturally, the general logical structure model, as heretofore described, being set in such a way as to correspond to the predetermined logical structure, is not set in such a way as to correspond to every logical structure. Consequently, in the event that there is a change in the logical structure to which the general logical structure model corresponds, the general logical structure model is updated in such a way as to correspond to the logical structure after the change. For example, in the event that a client has started to handle a template β in addition to a template α, a general logical structure model, which had been set in such a way as to correspond to the template α, is updated in such a way as to correspond to the template β, too. In this case, however, in the event that the update of the general logical structure model is not carried out appropriately, there is a danger that a recognition of the template α, which is the previously existing model, will cease to go smoothly. Trouble may occur in the event that a user starts an operation without noticing that the update was not carried out appropriately. The image recognition apparatus according to the first embodiment allows the user to avoid an occurrence of this kind of inconvenience that accompanies the update of the general logical structure model.

Outline and Characteristic of Image Recognition Apparatus According to First Embodiment A description will be given, using FIG. 1, of the outline and characteristic of the image recognition apparatus according to the first embodiment. FIG. 1 is a diagram illustrating the outline and characteristic of the image recognition apparatus according to the first embodiment.

The image recognition apparatus according to the first embodiment, as described above, represents an outline of a recognition of each logical element based on a general logical structure model set in such a way as to correspond to the predetermined logical structure, with regard to an image in which individual character strings are each depicted as a plurality of logical elements configuring a predetermined logical structure, and has a main characteristic of allowing the user to avoid an occurrence of the inconvenience that accompanies an update of the general logical structure model.

To give a simple description of the main characteristic, firstly, the image recognition apparatus according to the first embodiment collects the predetermined logical structure image information to be processed with the predetermined general logical structure model. For example, the image recognition apparatus collects both an input form image that is recognized based on the pre-update general logical structure model, and a recognition result from when the input form image was recognized based on the pre-update general logical structure model as the information of the form of template α to be processed with the predetermined general logical structure model (the pre-update general logical structure model) (refer to 1 of FIG. 1).

Next, when the predetermined general logical structure model is updated to a new general logical structure model (a post-update general logical structure model) in such a way as to correspond to a new logical structure, the image recognition apparatus acquires a recognition result from the recognition of the input form image based on the post-update general logical structure model by processing the collected input form image with the post-update general logical structure model.

For example, when the general logical structure model is updated in such a way as to correspond to the template β (refer to 2 of FIG. 1), by processing the collected input form image (the template α) with the post-update general logical structure model (refer to 3 of FIG. 1), the image recognition apparatus acquires a recognition result from the input form image based on the post-update general logical structure model (refer to 4 of FIG. 1).

Then, the image recognition apparatus compares whether or not the recognition result, wherein the collected information has been processed with the pre-update general logical structure model, matches the recognition result from the post-update general logical structure model. For example, the image recognition apparatus compares whether or not the collected recognition result matches the recognition result from the post-update general logical structure model (refer to 5 of FIG. 1).

Subsequently, in the event that a result of the comparison is a non-match, the image recognition apparatus outputs warning information indicating a warning about the post-update general logical structure model to an output unit. For example, in the event that the result of the comparison is a non-match, the image recognition apparatus outputs warning information to a display of the image recognition apparatus (refer to 6 of FIG. 1).

In this way, the image recognition apparatus according to the first embodiment can allow the user to avoid an occurrence of the inconvenience that accompanies an update of the general logical structure model. That is, when the general logical structure model is updated to a new general logical structure model, the image recognition apparatus verifies whether or not the post-update general logical structure model has been appropriately updated and, as the image recognition apparatus notifies the user by outputting warning information in the event that it has not been appropriately updated, the user can be aware that the general logical structure model has not been appropriately updated.

Configuration of Image Recognition Apparatus According to First Embodiment

Figure 2:
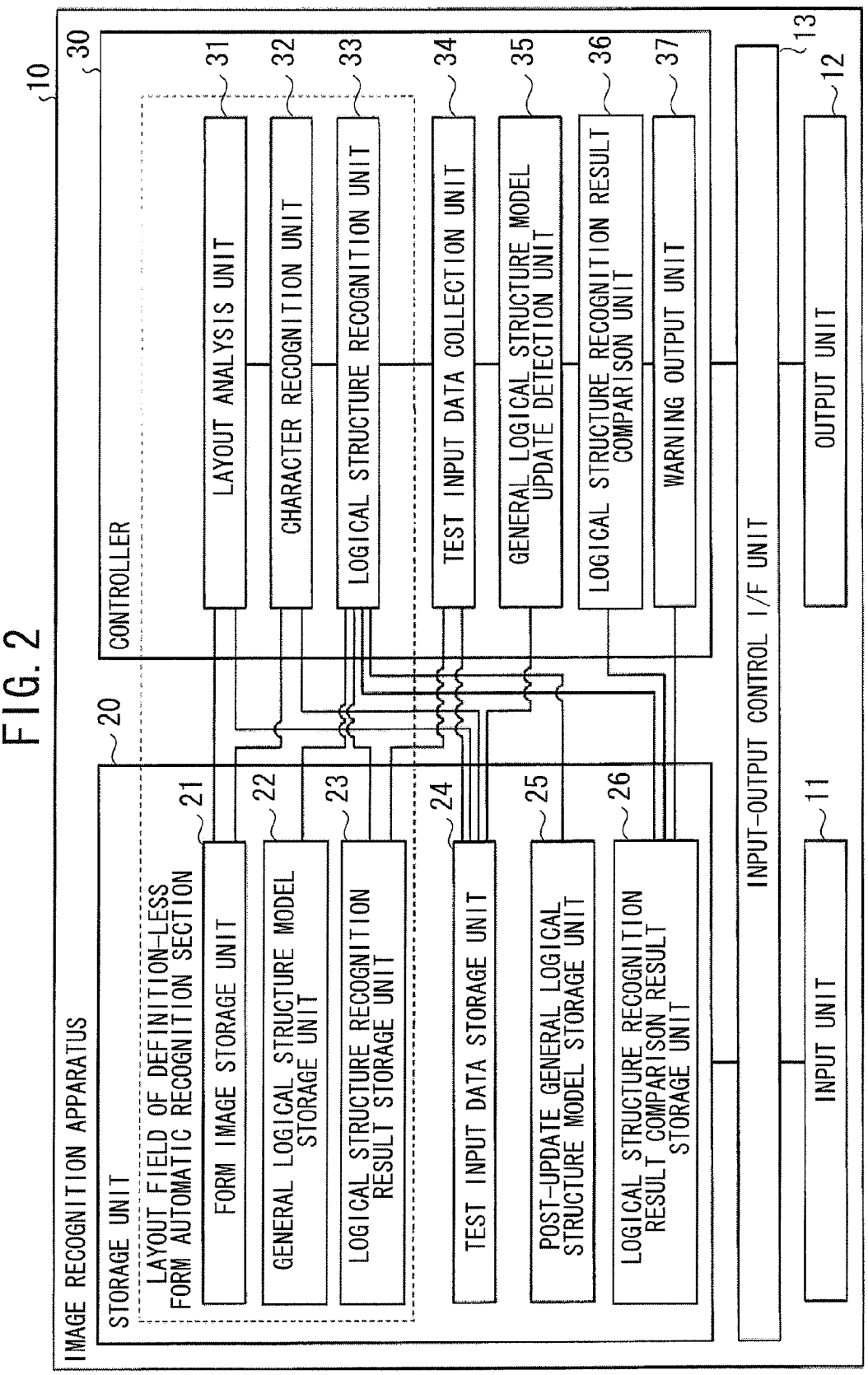
FIG. 2 is a block diagram showing a configuration of the image recognition apparatus according to the first embodiment.

Next, a description will be given, using FIGS. 2 to 12, of the image recognition apparatus according to the first embodiment. FIG. 2 is a block diagram showing the configuration of the image recognition apparatus according to the first embodiment. FIG. 3 is a diagram illustrating a form image storage unit. FIGS. 4A and 4B are diagrams illustrating a general logical structure model storage unit. FIG. 5 is a diagram illustrating a logical structure recognition result storage unit. FIGS. 6A and 6B are diagrams illustrating a test input data storage unit. FIGS. 7 to 9 are diagrams illustrating a post-update general logical structure model storage unit. FIGS. 10 and 11 are diagrams illustrating a logical structure recognition result comparison result storage unit. FIG. 12 is a diagram illustrating a warning output unit.

As shown in FIG. 2, the image recognition apparatus 10 according to the first embodiment is configured of an input unit 11, an output unit 12, an input-output control I/F unit 13, a storage unit 20, and a controller 30. Here, the portion surrounded by a dotted line in FIG. 2 is a layout field of a definition-less form automatic recognition section. Hereafter, firstly, a simple description will be given of a "layout field of definition-less form automatic recognition."

Regarding Layout Field of Definition-Less Form Automatic Recognition

To date, in order to extract necessary data from among image data acquired by scanning a paper form, it has been necessary to define a layout of the form in advance. That is, by compiling a "layout field of definition" which describes what is written in which area, and by recognizing a character string written in a relevant area, an extraction of data is carried out. However, because the "layout field of definition" has to be compiled by human hand, handling a variety of forms may lead to a high cost as a result of having to compile a "layout field of definition" for each one.

Because of this, the image recognition apparatus according to the first embodiment uses a logical structure recognition technique that uses a general logical structure (otherwise referred to as a common logical structure). With this technique, general basic knowledge is held in a format of a "general logical structure model," and a logical structure (individual logical elements) of a form is recognized while referring to the "general logical structure model." Hereafter, such a technique will be called a "layout field of definition-less form automatic recognition," meaning that there is no necessity to compile a "layout field of definition."

Things relating to general knowledge, such as the knowledge that, for example, a "full name" is configured of two items of data, a "family name" and a "first name," and knowledge that for a "full name," two kinds of methods, "furigana" and "kanji," may be depicted as a pair, are depicted in the "general logical structure model." Also, a "general logical structure model" is, in general, prepared for each kind of form. For example, a "general logical structure model" may be defined for each form such as a packing list form or an invoice form. Here, ideally, for example, information for a correct logical structure recognition of all packing list forms should be included in the "general logical structure model" relating to the packing list form. However, it is difficult to collect all the packing list forms in advance and include such information in the "general logical structure model." Consequently, in a regular operation, the "general logical structure model" is customized to be compatible with a form used in a particular business. That is, a new heading character string and data structure are added or corrected to be compatible with a form handled in that business. In the event that this addition or correction is inappropriate, there is a danger that a form that has been correctly recognized in the past will become impossible to recognize.

However, the "layout field of definition-less form automatic recognition" accepts a form image as an input, and computes a form logical structure (recognized individual logical elements) as an output. That is, when a form image is input, the "layout field of definition-less form automatic recognition," carries out a layout analysis and character recognition of the form image, carries out a logical structure recognition using a layout analysis result and a character recognition result, and outputs a form logical structure.

In the image recognition apparatus according to the first embodiment, there are two phases to the "layout field of definition-less form automatic recognition." Firstly, in a regular layout field of definition-less form automatic recognition operation phase (phase 1), the image recognition apparatus analyzes a logical structure of an input form image (a form image realized as an electronic image or a PDF), and outputs a form logical structure. Also, in phase 1, the image recognition apparatus collects, as appropriate, a pair of a form image and a recognition result (a form logical structure) corresponding to the form image. Meanwhile, in a general logical structure model verification phase (phase 2), the image recognition apparatus stops the regular operation, and carries out maintenance of the general logical structure model. Specifically, the image recognition apparatus, using a post-update general logical structure model, executes the layout field of definition-less form automatic recognition of the form image collected in the operation phase. Then, the image recognition apparatus compares the recognition result from the post-update general logical structure model with the recognition result collected in the operation phase, and confirms that identical results have been acquired. In the event that a result is acquired to the effect that they are not identical, the image recognition apparatus warns that the update of the general logical structure model is affecting the logical structure recognition result of the heretofore input form image.

Regarding Each Unit

The input unit 11 is a unit that inputs a form image. Specifically, the input unit 11 inputs a form image, which is to be a recognition subject of the image recognition apparatus 10, and stores it in a form image storage unit 21. In this case, the input unit 11 may be, for example, a scanning device. Also, the input unit 11 is a unit that inputs an operation of a user who confirms a recognition result and the like of the image recognition apparatus 10. In this case, the input unit 11 may be, for example, a mouse, a keyboard, or the like.

The output unit 12 is a unit that outputs a recognition result of the image recognition apparatus 10, a recognition result comparison result, and the like. Specifically, the output unit 12 outputs a recognition result comparison result (a comparison result stored in a logical structure recognition result comparison result storage unit 26, to be described hereafter) output by a warning output unit 37, to be described hereafter. For example, the output unit 12, which may be a display, a communication unit, and the like, displays warning information on the display, and transmits warning information, via the communication unit, to a predetermined mail address, and so on. The output unit 12 corresponds to an "output unit" described in the claims.

The input-output control I/F unit 13 is a unit that controls data transfer between the input unit 11 and output unit 12, and between the storage unit 20 and controller 30.

The storage unit 20 stores data used in each process of the controller 30, and includes the form image storage unit 21, a general logical structure model storage unit 22, a logical structure recognition result storage unit 23, a test input data storage unit 24, a post-update general logical structure model storage unit 25, and the logical structure recognition result comparison result storage unit 26, as units particularly closely related to the embodiment, as shown in FIG. 2.

The form image storage unit 21 is a unit that stores the form image that the image recognition apparatus 10 takes as a recognition subject. Specifically, the form image storage unit 21 stores a form image input by the input unit 11 (a scanning device, or the like). The stored form image is used in processes of a layout analysis unit 31, a character recognition unit 32, and a logical structure recognition unit 33, all to be described hereafter. For example, the form image storage unit 21 may store the kind of form image shown in FIG. 3.

Returning to FIG. 2, the general logical structure model storage unit 22 is a unit that stores a general logical structure model used when the image recognition apparatus 10 recognizes individual logical elements. Specifically, the general logical structure model storage unit 22 stores a general logical structure model for recognizing individual logical elements of a form image stored in the form image storage unit 21, and the stored general logical structure model is used in a process of the logical structure recognition unit 33, to be described hereafter. The general logical structure model storage unit 22 stores a general logical structure model (for example, a general logical structure model in which a logical structure and logical elements are appropriately designed by the user or the like) prepared in advance by a user who uses the image recognition apparatus 10, and so on.

Here, to give a description of a general logical structure model stored by the general logical structure model storage unit 22 by offering a specific example, the general logical structure model storage unit 22 stores, for example, the general logical structure model shown in FIGS. 4A and 4B as a general logical structure model. The general logical structure model shown in FIGS. 4A and 4B, which is conceptually realized as a tree structure in FIG. 4A, is actually stored as the kind of table structure shown in FIG. 4B.

A general logical structure model is composed of kinds of logical elements being depicted on each line of the table shown in FIG. 4B, namely, details of a logical element ID number, a heading character string, a meaning, a tree structure tier, a tree structure parent ID number, a positional relationship among logical elements, an attribute, and a data character string depicted in order from the left to the right. Among these, as can be seen by referring to the "purchase application form" of FIG. 3, a character string written as a section heading in the form image is depicted as the heading character string. The positional relationship, which may mean, for example, that a "family name" section has a "first name" section with an "ID=8" to its immediate right, describes a relative position among the logical elements. An item that has materiality in the tree structure is depicted as a "node," while an item that has no materiality and assembles a set related by meaning is depicted as a "group" under the attribute. Also, character conditions that a corresponding character string should satisfy are depicted for each node. For example, character types may be restricted to "numerals" and "hyphens" for a "telephone number."

Returning to FIG. 2, the logical structure recognition result storage unit 23 is a unit that stores a result of recognizing each logical element of a form image. Specifically, the logical structure recognition result storage unit 23 stores a result of a recognition by the logical structure recognition unit 33, to be described hereafter, and the stored recognition result is used in a process of a test input data collection unit 34, to be described hereafter.

Here, to give a description of a recognition result stored by the logical structure recognition result storage unit 23, offering a specific example, the logical structure recognition result storage unit 23 stores, for example, the recognition result shown in FIG. 5 as the recognition result. The recognition result shown in FIG. 5 shows a recognition result recognizing a character string for each category of logical element, and a recognition result recognizing which logical element each character string is depicted as.

To give a description of each logical element, for example, a logical element that is a "family name" of a "full name," under "personal information," is recognized as the character string "Patent." Also, for example, a logical element which is a "code," under "application information," is recognized as a character string "16756400." Here, as can be seen by referring to FIG. 4B, in the general logical structure model, the logical element "code" is depicted as a numerical string in a case in which the heading character string is a "No." Consequently, as can be seen by referring to FIG. 3, "16756400" and the like, which are numerical strings where the heading character string is a "No.," are recognized as the logical element "code." The same applies to other logical elements.

Returning to FIG. 2, the test input data storage unit 24 is a unit that stores data used when verifying a post-update general logical structure model. Specifically, the test input data storage unit 24 stores test input data collected by the test input data collection unit 34, to be described hereafter, and the collected test input data are used in processes of the layout analysis unit 31, the character recognition unit 32, and the logical structure recognition unit 33, all to be described hereafter.

Here, to give a description of test input data stored by the test input data storage unit 24, offering a specific example, the test input data storage unit 24 stores, for example, the data shown in FIGS. 6A and 6B as the test input data. Regarding the test input data shown in FIGS. 6A and 6B, FIG. 6A is an input form image, while FIG. 6B is a form image logical structure recognition result.

Returning to FIG. 2, the post-update general logical structure model storage unit 25 is a unit that stores a post-update general logical structure model. Specifically, when a general logical structure model is updated in another system not shown, the post-update general logical structure model storage unit 25 stores the post-update general logical structure model by having it written in by the relevant system, and the stored post-update general logical structure model is used in a process of the logical structure recognition unit 33, to be described hereafter.

Here, a description will be given of the other system that updates the general logical structure model. The other system is a system, such as a general logical structure model editing system that carries out a layout field of definition-less form automatic recognition on an input form image, using a pre-update general logical structure model. By presenting the user with a result thereof, the user edits and updates the general logical structure model in such a way as to output an intended recognition result (always being an intended recognition result relating to the input form image). Such a system may be included in the image recognition apparatus 10, or, as in the first embodiment, may be furnished as another system connected to the image recognition apparatus 10.

To imagine a situation using the general logical structure model editing system, a situation can be imagined in which, for example, a new client has entered and so it is necessary to handle a new form image. In this case, the user of the general logical structure model editing system inputs the new form image, and edits the general logical structure model in such a way as to output an intended recognition result relating to the new form image.

For example, the user inputs the new image form shown in FIG. 7, and edits the general logical structure model, as shown in FIGS. 8A and 8B. Here, as can be seen by referring to and comparing FIGS. 3 and 7, a "reference number" positioned above a "name" in the form image of FIG. 3 is positioned at a top right of the form image together with a heading character string "No." in the new form image of FIG. 7. Also, the numerical strings of the logical element "code" written together with the heading character string "No." in the form image of FIG. 3 are a list of numerical strings, with no heading character string, in the new form image of FIG. 7. To respond to these kinds of differences, the general logical structure model is updated in the way shown in FIGS. 8A and 8B. Although there is no change in the tree structure, as shown in FIG. 8A, the post-update general logical structure model is updated in the ways shown in the shaded portions of FIG. 8B. Specifically, by adding "No." to the heading character string that is the logical element "reference number," the user attempts to recognize the reference number of FIG. 7. Also, although there is no heading character string, the user attempts to recognize the code of FIG. 7 by recognizing it as the logical element "code" in the event that it is an "8 digit numerical string."

FIG. 9 shows a recognition result in a case in which the general logical structure model editing system, using the post-update general logical structure model shown in FIGS. 8A and 8B, recognizes the new form image shown in FIG. 7. As shown in FIG. 9, "29" written together with the heading character string "No." is recognized as the logical element "reference number," and the "8 digit numerical string" is recognized as the logical element "code." The user of the general logical structure model editing system checks the recognition result output as shown in FIG. 9, determines that it is the intended recognition result, and finishes the editing of the general logical structure model.

In the first embodiment, when the editing of the general logical structure model in the general logical structure model editing system is finished, the post-update general logical structure model is stored in the post-update general logical structure model storage unit 25 of the image recognition apparatus 10. Consequently, the post-update general logical structure model storage unit 25 stores, for example, the post-update general logical structure model shown in FIG. 8B.

Returning to FIG. 2, the logical structure recognition result comparison result storage unit 26 is a unit that stores a result of a comparison of a recognition result processed with a pre-update general logical structure model and a recognition result processed with a post-update general logical structure model. Specifically, the logical structure recognition result comparison result storage unit 26, as well as storing the recognition result when a recognition result from the post-update general logical structure model is acquired by a general logical structure model update detection unit 35, to be described hereafter, stores a comparison result when a comparison is made by a logical structure recognition result comparison unit 36, to be described hereafter. The stored comparison result is used in a process of the warning output unit 37, to be described hereafter.

For example, the logical structure recognition result comparison result storage unit 26, as well as storing a recognition result (FIG. 10) from recognizing a past form image (FIG. 6A) based on a post-update general logical structure model, stores a result (FIG. 11) of comparing the recognition result (FIG. 6B) stored in the test input data storage unit 24 with the recognition result (FIG. 10).

Returning to FIG. 2, the controller 30 is a unit which, controlling the image recognition apparatus 10, executes various kinds of processes, and includes the layout analysis unit 31, the character recognition unit 32, the logical structure recognition unit 33, the test input data collection unit 34, the general logical structure model update detection unit 35, the logical structure recognition result comparison unit 36, and the warning output unit 37 as units particularly closely related to the embodiment, as shown in FIG. 2. The test input data collection unit 34 corresponds to a "collection unit" described in the claims, the general logical structure model update detection unit 35 corresponds to a "post-update recognition result acquisition unit" described in the claims, the logical structure recognition result comparison unit 36 corresponds to a "comparison unit" described in the claims, and the warning output unit 37 corresponds to a "warning output unit" described in the claims.

The layout analysis unit 31 is a unit that analyzes a layout of a form image. Specifically, the layout analysis unit 31 analyzes a layout of a form image stored in the form image storage unit 21, and a layout analysis result is used in a process of the logical structure recognition unit 33, to be described hereafter. For example, the layout analysis unit 31 retrieves a form image (FIG. 3 or the like) stored in the form image storage unit 21, and analyzes places in which a table, a line, a text-block, a diagram, and a stamp exist.

The character recognition unit 32 is a unit that recognizes a character string of a form image. Specifically, the character recognition unit 32 recognizes a character string of a form image stored in the form image storage unit 21, and a character string recognition result is used in a process of the logical structure recognition unit 33, to be described hereafter. For example, the character recognition unit 32 retrieves a form image (FIG. 3 or the like) stored in the form image storage unit 21, recognizes a character string existing in the form image, and outputs a character code corresponding to each character.

The logical structure recognition unit 33 is a unit that recognizes which logical element each character string is depicted as. Specifically, the logical structure recognition unit 33, using an analysis result from the layout analysis unit 31, a recognition result from the character recognition unit 32, and a general logical structure model (FIG. 4B or the like) stored in the general logical structure model storage unit 22, recognizes which logical element each character string is depicted as, and stores a recognition result (FIG. 5 or the like) in the logical structure recognition result storage unit 23.

The test input data collection unit 34 collects information on a form image processed with a general logical structure model. Specifically, the test input data collection unit 34, at a predetermined timing, stores a pair of a form image stored in the form image storage unit 21, and a recognition result stored in the logical structure recognition result storage unit 23 as a recognition result corresponding to the form image, in the test input data storage unit 24. The timing at which the test input data collection unit 34 collects the pair of the form image and the recognition result is set as appropriate by the user, or the like, who uses the image recognition apparatus 10 (the timing may be fixed as appropriate to suit an operational situation, or the like).

For example, the test input data collection unit 34 monitors the form image storage unit 21 and logical structure recognition result storage unit 23, and detects a layout field of definition-less form automatic recognition calculation start (a start of processes of the layout analysis unit 31 and the character recognition unit 32) and finish (a finish of the process of the logical structure recognition unit 33). Then, the test input data collection unit 34, by using an counter (not shown here), counts a number of layout field of definition-less form automatic recognition operations (the counter holds the number of layout field of definition-less form automatic recognition operations). When the number of operations meets a predetermined condition, the test input data collection unit 34 stores a pair of a form image and logical structure recognition result being used at the time in the test input data storage unit 24. Here, the predetermined condition is set as, for example, every $n^{th}$ layout field of definition-less form automatic recognition operation. Also, various conditions can be considered for the timing of storing (collecting) information, such as changing the counter to a timer and storing every n seconds, or using both the counter and the timer to record the first n items after an idling state of a time t. Any of the conditions is acceptable as long as it is a condition appropriate to an operational situation. Although a method of collecting a pair of a form image and its logical structure recognition result as test input data was described in the first embodiment, the methods are not limited to this. Collecting both a form image and a general logical structure model, or only a form image, or the like is acceptable.

When a general logical structure model is updated, the general logical structure model update detection unit 35 acquires a recognition result of a recognized past form image based on the post-update general logical structure model. Specifically, the general logical structure model update detection unit 35, when detecting an update of a general logical structure model, writes the post-update general logical structure model into the post-update general logical structure model storage unit 25, recognizes (re-executes the recognition using the layout analysis unit 31, the character recognition unit 32, and the logical structure recognition unit 33) a past form image (FIG. 6A or the like) stored in the test input data storage unit 24, based on a post-update general logical structure model (FIG. 8 or the like) stored in the post-update general logical structure model storage unit 25, and stores a recognition result (FIG. 10 or the like) in the logical structure recognition result comparison result storage unit 26. The detection of an update of a general logical structure model by the general logical structure model editing system may also be notified to the general logical structure model update detection unit 35.

Here, as can be seen by looking at the recognition result of FIG. 10, the "8 digit numerical strings," which should originally be recognized as the logical element "code" in FIG. 9, are all recognized as the logical element "reference number." On looking again at the post-update general logical structure model (FIG. 8B), "No." is registered twice as a heading character string inconsistently. That is, there is a "No." for the logical element "code" in the pre-update general logical structure model, and a "No." for the logical element "reference number" registered in the post-update general logical structure model. Since a plurality of "No." inputs is inconsistently registered in this way, it can be understood that, when the form image of FIG. 3 is recognized based on the general logical structure model of FIG. 8B, the 8 digit numerical strings next to the heading character string "No." have all been mistakenly recognized as the logical element "reference number."

Although this kind of update is an inappropriate update, there is a danger that this kind of inappropriate update may occur when a user who is not familiar with the pre-update general logical structure model (or the form image) tries to carry out an update of the general logical structure model.

Returning to FIG. 2, the logical structure recognition result comparison unit 36 compares whether or not a recognition result from a pre-update general logical structure model matches a recognition result from a post-update general logical structure model. Specifically, the logical structure recognition result comparison unit 36 stores a recognition result from a pre-update general logical structure model stored in the test input data storage unit 24 in the logical structure recognition result comparison result storage unit 26, and compares it with a recognition result from a post-update general logical structure model already stored in the logical structure recognition result comparison result storage unit 26.

In the event that the test input data stored in the test input data storage unit 24 are a form image and a general logical structure model, it is sufficient that the logical structure recognition result comparison unit 36, using the relevant form image and general logical structure model, carries out a logical structure recognition of the form image with the pre-update general logical structure model, thus acquiring a logical structure recognition result as a subject of comparison. Also, in the event that the test input data stored in the test input data storage unit 24 are only data of a form image, it is sufficient that the logical structure recognition result comparison unit 36, when receiving a post-update general logical structure model edited by the general logical structure model editing system in the post-update storage unit, or the like, simultaneously accepts the pre-update general logical structure model. By so doing, as heretofore described, the situation will become the same as when using a form image and a general logical structure model as the test input data.

In the event that a result of a comparison is a non-match, the warning output unit 37 outputs warning information indicating a warning about the post-update general logical structure model. Specifically, in the event that a result of a comparison by the logical structure recognition result comparison unit 36 is a non-match, the warning output unit 37 outputs warning information to the output unit 12.

For example, the warning output unit 37, as shown in FIG. 12, presents the user with a place ("No." or the like) depicted in the general logical structure model corresponding to differing places ("reference number" and "code") in the comparison result. In this case, the user can ascertain places in the general logical structure model which should be corrected, and start a correction operation (a place depicted in the general logical structure model corresponding to differing places in the comparison result can be found by, for example, searching for where in the general logical structure model a definition of a heading character string in the differing area of the comparison result is depicted). It is also acceptable that the warning output unit 37, by outputting the form image when the comparison result differs in the output unit 12 and presenting it to the user, clarifies the form image to pay attention to when correcting the general logical structure model. Alternatively, it is also acceptable that the warning output unit 37 transmits warning information to the general logical structure model editing system, and so on.

Process Procedure of Image Recognition Apparatus According to First Embodiment

Figure 13:
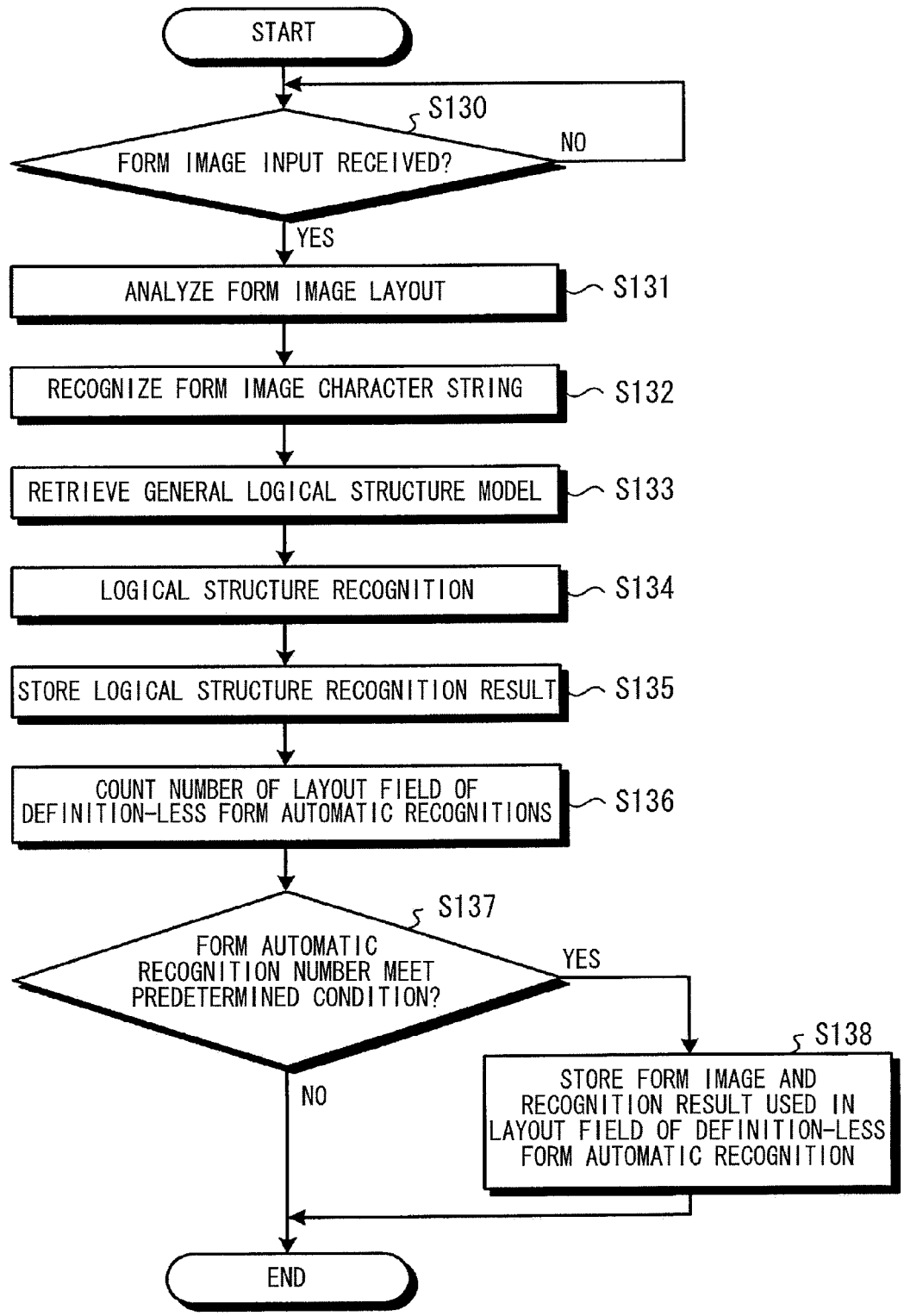
FIG. 13 is a flowchart showing a process procedure of the image recognition apparatus according to the first embodiment (an operation phase)
Figure 14:
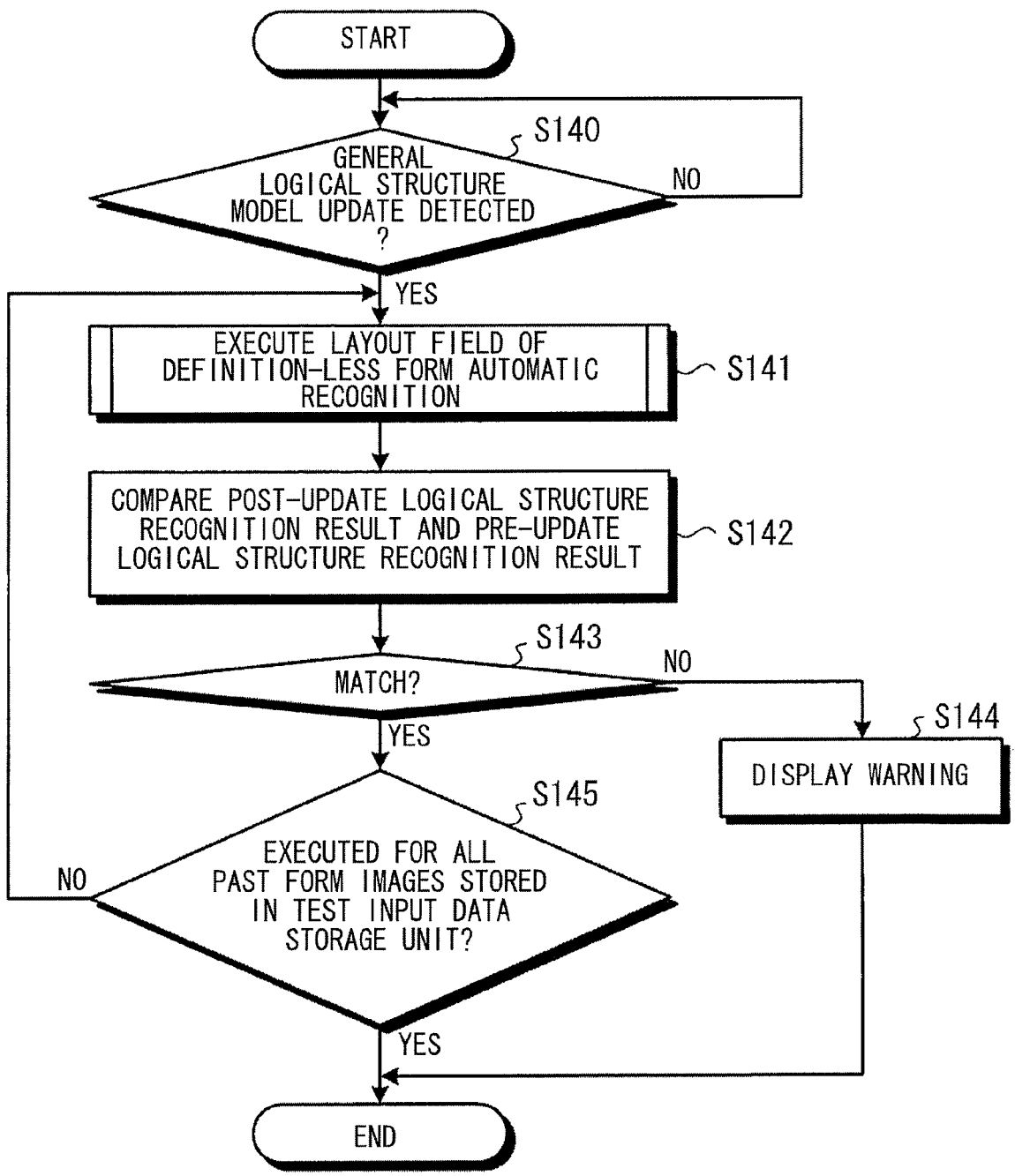
FIG. 14 is a flowchart showing a process procedure of the image recognition apparatus according to the first embodiment (a verification phase).

Next, using FIG. 13, a description will be given of the process procedure of the image recognition apparatus according to the first embodiment. FIG. 13 is a flowchart showing the process procedure of the image recognition apparatus according to the first embodiment (the operation phase), while FIG. 14 is a flowchart showing the process procedure of the image recognition apparatus according to the first embodiment (the verification phase).

Operation Phase (FIG. 13)

Firstly, the image recognition apparatus 10, on receiving an input of a form image (step S130: Yes), stores the input in the form image storage unit 21. Next, the layout analysis unit 31 analyzes a layout of the form image stored in the form image storage unit 21 (step S131).

Next, the character recognition unit 32 recognizes a character string of the form image stored in the form image storage unit 21 (step S132). Then the logical structure recognition unit 33 retrieves a general logical structure model from the general logical structure model storage unit 22 (step S133), executes a logical structure recognition (step S134), and stores a recognition result in the logical structure recognition result storage unit 23 (step S135).

Then, the test input data collection unit 34 counts a number of layout field of definition-less form automatic recognition operations (step S136), and determines whether or not the number of form automatic recognitions has met a predetermined condition (step S137). If it has met the predetermined condition (step S137: Yes), the test input data collection unit 34 stores the recognition results of the relevant form image and the current form image used in the layout field of definition-less form automatic recognition in the test input data storage unit 24 (step S138). Meanwhile, if the number of form automatic recognitions has not met the predetermined condition (step S137: No), the test input data collection unit 34 finishes the process directly.

Verification Phase (FIGS. 13 and 14)

Firstly, when the general logical structure model update detection unit 35 detects an update of a general logical structure model (step S140: Yes), the image recognition apparatus 10 executes a layout field of definition-less form automatic recognition (step S141).

Step S141 is the same as steps S131 to S135 of FIG. 13 but the following differences, such as the units which execute the process, subject data, and the like, will be described. Firstly, the layout analysis unit 31 analyzes a layout of a form image stored in the test input data storage unit 24 (step S131), the character recognition unit 32 recognizes a character string of the form image stored in the test input data storage unit 24 (step S132), and the logical structure recognition unit 33 retrieves a post-update general logical structure model from the post-update general logical structure model storage unit 25 (step S133), executes a logical structure recognition (step S134), and stores a recognition result in the logical structure recognition result comparison result storage unit 26 (step S135).

Returning to FIG. 14, the logical structure recognition result comparison unit 36 compares the pre-update logical structure recognition result stored in the test input data storage unit 24 with the post-update logical structure recognition result stored in the logical structure recognition result comparison result storage unit 26 (step S142).

Then, if the result of the comparison is a non-match (step S143: No), the warning output unit 37 displays warning information in the output unit 12 (step S144), and finishes the process. Meanwhile, if the result of the comparison is a match (step S143: Yes), the image recognition apparatus 10 determines whether or not the layout field of definition-less form automatic recognition has been executed for all past form images stored in the test input data storage unit 24 (step S145) and, if any past form image remains (step S145: No), returns to the process of step S141. Meanwhile, if no past form image remains (step S145: Yes), the image recognition apparatus 10 finishes the process.

Advantage of First Embodiment

As heretofore described, according to the first embodiment, it is possible to allow the user to avoid an occurrence of the inconvenience which accompanies an update of a general logical structure model.

Second Embodiment

So far, in the first embodiment, a description has been given of a method wherein the image recognition apparatus collects a pair of a test input data form image and logical structure recognition result in the operation phase, as appropriate (at a predetermined timing). However, not being limited to this, a method collecting the form image being used when a general logical structure model is updated is also acceptable. As a second embodiment, a description will be given of a method collecting the form image being used when a general logical structure model is updated.

It can be considered that the user updates a general logical structure model when a form which should be newly handled appears, or when a form whose logical structure cannot be correctly recognized is found, and so on. Consequently, it can be considered that the user updates a general logical structure model when a form image is input whose operational situation differs from a previously input form image. Thus, it can be said that by collecting these form images as test input data, it is possible to comprehensively test the form images.

FIGS. 15A and 15B are diagrams illustrating a test input data collection timing in an image recognition apparatus according to the second embodiment. FIG. 15A illustrates the method of the first embodiment, while FIG. 15B illustrates the method of the second embodiment.

As shown in FIGS. 15A and 15B in the following description, firstly, it is taken that an operation has started with a general logical structure model set in such a way as to correspond to the template α. It is taken that the general logical structure model at this time, using a form x of the template α as an input, has been edited in the general logical structure model editing system. Also, after that, as shown in FIG. 15A, when the template β and a template γ, which should be newly handled, appear, the general logical structure model takes a form y and a form z as inputs in such a way as to correspond also to each of the templates, and has been updated in the general logical structure model editing system. Forms 1 to 5 refer to form images input in the operation phase. The forms 1 to 3 all correspond to the template α, but after the update of the general logical structure model, the form that corresponds to the template β, as the form 4 does, and the form that corresponds to the template α, as the form 5 does, are both input.

According to the method of the first embodiment, the image recognition apparatus collects a form image as test input data at a predetermined timing. For example, in the event that the predetermined timing is every odd number of times, the image recognition apparatus collects the form 1, the form 3 and the form 5 as the test input data. Then, the test input data, when having to update to the general logical structure model that corresponds to the template γ, all become data corresponding to template α. In this case, it is not possible to verify, based on the post-update general logical structure model set in such a way as to correspond to the template y, whether or not the template β is correctly recognized.

As opposed to this, according to the method of the second embodiment, when a general logical structure model is updated in such a way as to correspond to a new form image, the image recognition apparatus collects the form image as test input data. For example, as shown in FIG. 15B, the image recognition apparatus collects the form x and the form γ as test input data. Then, the test input data at the time when the general logical structure model that corresponds to the template γ has to be updated can be verified for all the form recognition results of every test input data computed with template γ as to whether the data corresponds to those results computed with template α or template β.

It is generally desirable that a verification of a general logical structure model is not only a verification with all of the templates, but also a verification with every form (forms on which an actual character string is written). Consequently, it is acceptable to collect all the forms as test input data, and ultimately, it is acceptable that a timing of the collection is selected as appropriate to suit an operational situation.

Advantage of Second Embodiment

As heretofore described, according to the second embodiment, it is possible to collect test input data effectively and comprehensively.

Third Embodiment

Figure 16:
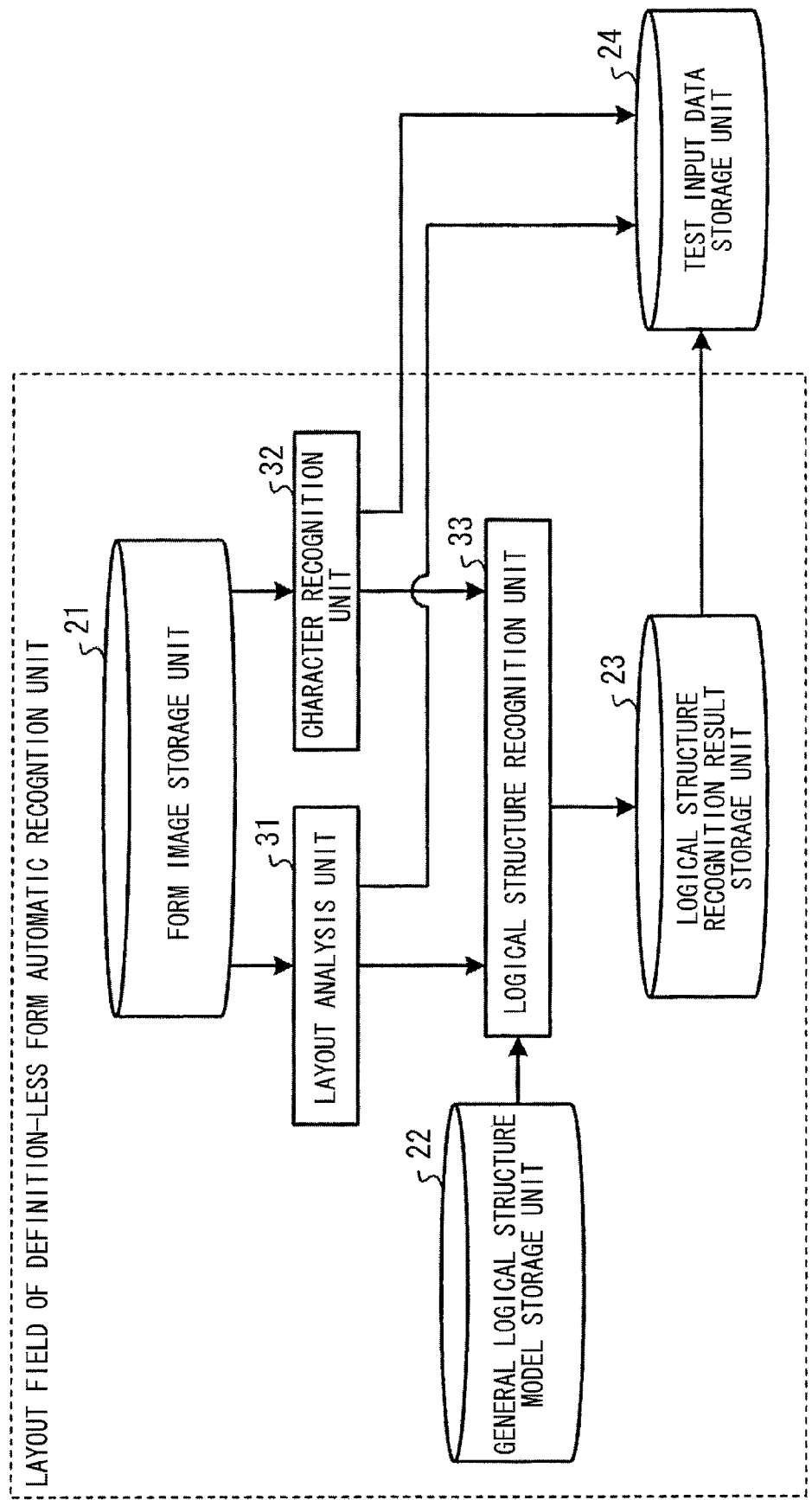
FIG. 16 is a diagram illustrating an image recognition apparatus according to a third embodiment.

So far, in the first and second embodiments, an original of a form image has been stored as test input data. However, as it should be sufficient, in order to recognize a logical structure of the form image, that there is information immediately before being input into the logical structure recognition unit (interim process data), there is no need to store the original form image. That is, as shown in FIG. 16, it is sufficient to store, in place of the form image, a layout analysis result (a result of an analysis by the layout analysis unit 31) acquired by processing the form image in advance, and a character string recognition result (a result of a recognition by the character recognition unit 32) in the test input data storage unit 24. For example, it is sufficient that the image recognition apparatus stores an "analysis result of places where a table, a line, a text-block, a diagram, and a stamp, and the like exist," which is a layout analysis result, and a "character code," which is a character string recognition result, as test input data.

In this way, by holding interim process data, a subsequent logical structure recognition calculation time becomes shorter, and also, with a data size becoming smaller than when holding the form image itself, it is possible to reduce memory capacity.

Advantage of Third Embodiment

As heretofore described, according to the third embodiment, a logical structure recognition calculation time becomes shorter, and also, it is possible to reduce memory capacity.

Fourth Embodiment

Other Embodiments

Although a description has been given thus far of the embodiments of the invention, it is also acceptable that the invention is embodied in various differing aspects other than the heretofore described embodiments.

System Configuration and the Like

In the first to third embodiments, a description has been given of a case in which the method of collecting the test input data, and the method of verifying based on the collected test input data, are realized by the same apparatus, but this is not limiting. For example, it is also acceptable that an image recognition apparatus used in the so-called operation phase may include a layout field of definition-less form automatic recognition unit, a test input data collection unit, a test input data storage unit, and a communication unit; while an image recognition apparatus used in the so-called verification phase may include a layout field of definition-less form automatic recognition unit, a post-update general logical structure model storage unit, a logical structure recognition result comparison result storage unit, a general logical structure model update detection unit, a logical structure recognition result comparison unit, a warning output unit, and a communication unit. In this case, test input data stored in the test input data storage unit by the image recognition apparatus used in the operation phase are transmitted by that image recognition apparatus, via the communication unit, to the image recognition apparatus used in the verification phase, received by the communication unit of the image recognition apparatus used in the verification phase, and used in a verification, and so on. This kind of configuration is also effective in a case in which the individual image recognition apparatuses are set far apart, such as, for example, where one image recognition apparatus is set in Tokyo and the other image recognition apparatus is set in Osaka.

Also, among the processes described in the embodiments, it is possible to carry out manually all or a portion of the processes described as being carried out automatically, or again, it is also possible to carry out automatically, by a heretofore known method, all or a portion of the processes described as being carried out manually. Alternatively, it is possible to optionally change a process procedure (for example, FIGS. 13, 14 and the like), a control procedure, a specific name, and information including various kinds of data or parameter shown in the above document or in the drawings, unless specified otherwise.

Also, each component of each apparatus shown in the drawings being functionally conceptual, it is not required that such components are physically configured as shown in the drawings (FIG. 2 and the like). That is, a specific aspect of a dispersal and integration of each apparatus not being limited to that shown in the drawings, it is possible to configure by functionally or physically dispersing or integrating a whole or a portion thereof, in optional units, depending on various kinds of load, usage or the like. Furthermore, a whole or an optional portion of each process function carried out by each apparatus may be realized by a CPU and a program analyzed and executed by the CPU, or realized as hardware using wired logic.

Program

Figure 17:
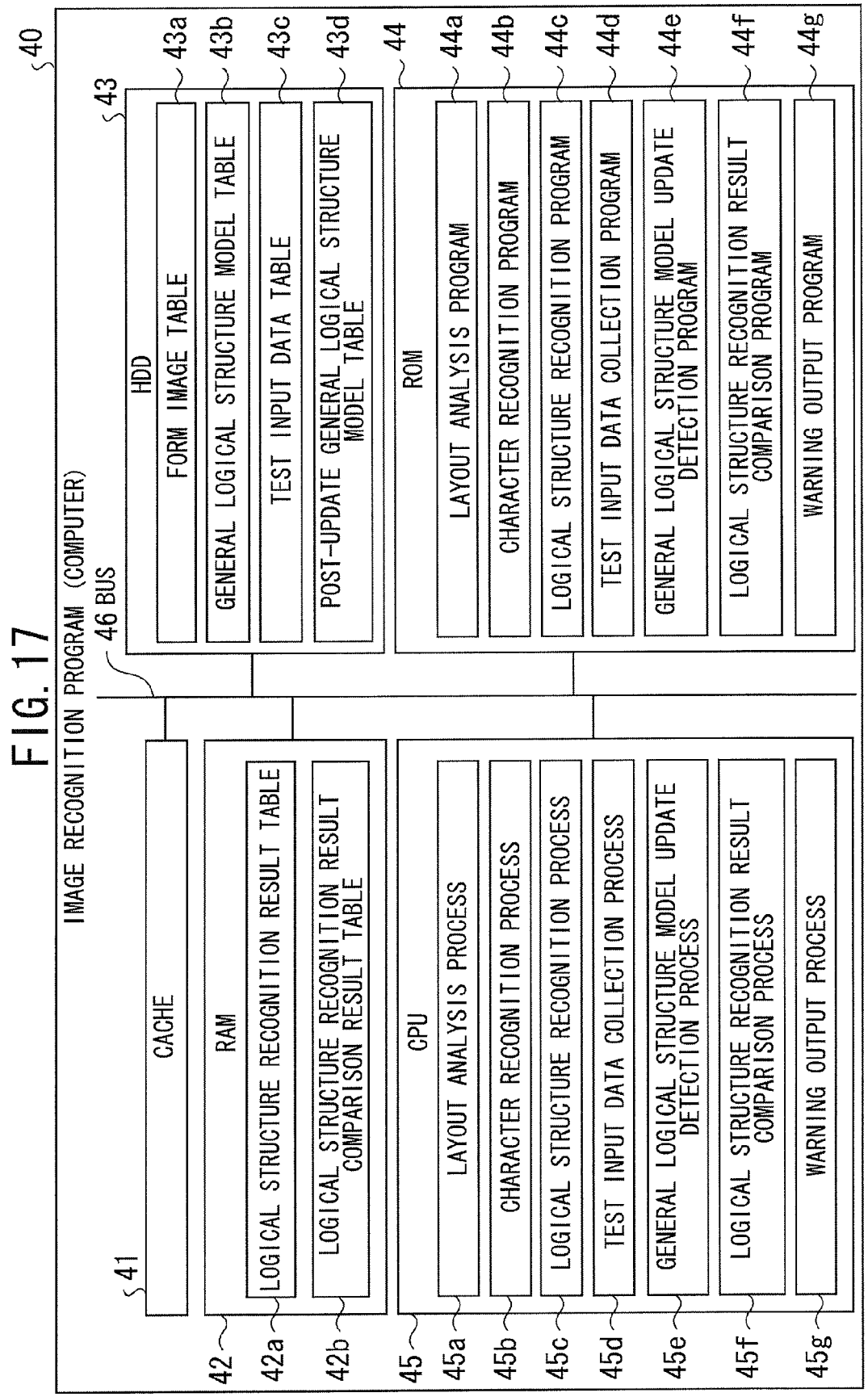
FIG. 17 is a diagram showing a computer that executes an image recognition program.

Each kind of process described in the above embodiments can be realized by executing the process with a computer such as a program prepared in advance, a personal computer, or a workstation. As such, hereafter, a description will be given, using FIG. 17, of an example of a computer which executes an image recognition program having the same kinds of function as in the heretofore described first embodiment. FIG. 17 is a diagram showing a computer that executes the image recognition program.

As shown in FIG. 17, an image recognition program (a computer) 40 is configured to connect a cache 41, an RAM 42, an HDD 43, an ROM 44 and a CPU 45 by a bus 46. Here, image recognition programs performing the same kinds of functions as in the heretofore described first embodiment, that is, a layout analysis program 44a, a character recognition program 44b, a logical structure recognition program 44c, a test input data collection program 44d, a general logical structure model update detection program 44e, a logical structure recognition result comparison program 44f, and a warning output program 44g, are stored in advance in the ROM 44 as shown in FIG. 17.

Then, by the CPU 45 retrieving and executing the programs 44a to 44g, each program 44a to 44g performs respectively a layout analysis process 45a, a character recognition process 45b, a logical structure recognition process 45c, a test input data collection process 45d, a general logical structure model update detection process 45e, a logical structure recognition result comparison process 45f, and a warning output process 45g, as shown in FIG. 17. Each process 45a to 45g corresponds respectively to the layout analysis unit 31, the character recognition unit 32, the logical structure recognition unit 33, the test input data collection unit 34, the general logical structure model update detection unit 35, the logical structure recognition result comparison unit 36, and the warning output unit 37 shown in FIG. 2.

Also, as shown in FIG. 17, a form image table 43a, a general logical structure model table 43b, a test input data table 43c, and a post-update general logical structure model table 43d are provided in the HDD 43. Each table 43a to 43d corresponds respectively to the form image storage unit 21, the general logical structure model storage unit 22, the test input data storage unit 24, and the post-update general logical structure model storage unit 25 shown in FIG. 2.

However, regarding the heretofore described programs 44a to 44g, besides storing the programs in the ROM 44, it is also acceptable to arrange the programs in such a way that they are stored on a computer readable recording medium, for example, on a "portable physical medium" such as a flexible disc (FD), a CD-ROM, an MO disc, a DVD, a magnetic optical disc, or an IC card, inserted into the computer 40, or on a "fixed physical medium" such as a hard disc drive (HDD), furnished inside or outside the computer 40, or furthermore, in "another computer (or a server)" connected to the computer 40 via a public line, an internet, a LAN, a WAN or the like, where the computer 40 retrieves and executes the program.

As heretofore described, the image recognition apparatus, the image recognition program, and the image recognition method according to the invention, with regard to an image in which individual character strings are depicted as each of a plurality of logical elements configuring a predetermined logical structure, are useful in recognizing each logical element based on a general logical structure model set in such a way as to correspond to the predetermined logical structure, and in particular, are suited to allow the user to avoid an occurrence of the inconvenience which accompanies an update of the general logical structure model.

What is claimed is:

1. An image recognition apparatus comprising:
   a storage device; and
   a processor, with regard to an image in which individual character strings are depicted as each of a plurality of logical elements configuring a logical structure, to recognize each of the logical elements based on a general logical structure model set in such a way as to correspond to the logical structure,
   to store the recognition result in the storage device,
   to collect information on the image of the logical structure to be processed with the general logical structure model,
   to acquire a recognition result that is recognized based on a post-update structure model regarding a logical structure image stored in the storage device that corresponds to a pre-update logic structure model, by processing the collected information with the post-update logical structure model when the general logical structure model is updated to a new logical structure model in such a way as to correspond to a new logical structure, to which the general logical,
   to compare whether or not a recognition result when the information collected is processed with the general logical structure model, and the recognition result acquired from the post-update logical structure model, match, and
   to output warning information indicating a warning about the post-update logical structure model to an output unit in a case in which a result of the comparison is a non-match.

2. The image recognition apparatus according to claim 1, wherein
   information relating to a character string of the image, and information relating to a layout of the image, are recognized in advance in order to recognize each logical element of the image based on the general logical structure model, and
   the processor collects the information relating to the character string of the image, and the information relating to the layout of the image, recognized in advance as information to be processed by the general logical structure model, and
   acquires a recognition result by processing the information relating to the character string and the information relating to the layout collected.

3. The image recognition apparatus according to claim 1, wherein
   the processor, when the general logical structure model is updated in such a way as to correspond to the new logical structure, collects the information on an image of the new logical structure.

4. A computer readable recording medium on which is recorded an image recognition program causing a computer to execute a method, comprising:
   with regard to an image in which individual character strings are depicted as each of a plurality of logical elements configuring a logical structure, recognizing each of the logical elements based on a general logical structure model set in such a way as to correspond to the logical structure;
   storing recognition results of the logical structure recognition unit in a logical structure recognition result storage unit;
   collecting information on the image of the logical structure to be processed with the general logical structure model;
   acquiring a recognition result that is recognized based on a post-update logical structure model regarding a logical structure image stored in the logical structure recognition result storage unit that corresponds to a pre-update logic structure model, by processing the collected information with the post-update logical structure model when the general logical structure model is updated to a new logical structure model in such a way as to correspond to a new logical structure;
   comparing whether or not a recognition result when the information collected is processed with the general logical structure model, and a recognition result acquired from the post-update logical structure model, match; and outputting warning information indicating a warning about the post-update logical structure model to an output unit in a case in which a result of the comparison is a non-match.

5. An image recognition method, comprising:

with regard to an image in which individual character strings are depicted as each of a plurality of logical elements configuring a logical structure, recognizing each of the logical elements based on a general logical structure model set in such a way as to correspond to the logical structure;

storing recognition results of the logical structure recognition unit in a logical structure recognition result storage device;

collecting information on the image of the logical structure to be processed with the general logical structure model;

acquiring a recognition result that is recognized based on a post-update logical structure model regarding a logical structure image stored in the logical structure recognition result storage device that corresponds to a pre-update logic structure model, by processing the collected information with the post-update logical structure model when the general logical structure model is updated to a new logical structure model in such a way as to correspond to a new logical structure;

comparing whether or not a recognition result when the information collected is processed with the general logical structure model, and the recognition result acquired from the post-update logical structure model, match; and outputting warning information indicating a warning about the post-update logical structure model to an output unit in a case in which a result of the comparison is a non-match.

6. An image recognition apparatus comprising:

a storage device; and a processor, with regard to an image in which individual character strings are depicted as each of a plurality of logical elements configuring a logical structure, to recognize each of the logical elements based on a general logical structure model set in such a way as to correspond to the logical structure, to store results, to acquire a recognition result when a logical structure image stored in the storage device that corresponds to the general logical structure model is recognized, based on a new post-update logical structure model, by processing, with the post-update logical structure model, collected information processed with the general logical structure model of the logical structure image when the general logical structure model is updated as the new post-update logical structure model in such a way as to correspond to a new logical structure, to compare whether or not a recognition result when the information collected is processed with the general logical structure model, and the acquired recognition result from the post-update logical structure model, match, and to output warning information indicating a warning about the post-update logical structure model to an output unit, in a case in which a result of the comparison by the comparison unit is a non-match.

* * * * *

UNITED STATES PATENT AND TRADEMARK OFFICE
CERTIFICATE OF CORRECTION

PATENT NO. : 8,234,254 B2
APPLICATION NO. : 12/258896
DATED : July 31, 2012
INVENTOR(S) : Fujii et al.

It is certified that error appears in the above-identified patent and that said Letters Patent is hereby corrected as shown below:

In the Claims:

Col. 18, lines 9-10, delete "to which the general logical,".

Signed and Sealed this
Ninth Day of April, 2013

Teresa Stanek Rea
*Acting Director of the United States Patent and Trademark Office*